US006093461A

United States Patent [19]

Yamaguchi et al.

[11] Patent Number: 6,093,461
[45] Date of Patent: Jul. 25, 2000

[54] HEAT-AND CORROSION-RESISTING PROTECTION TUBE

[75] Inventors: Shinichi Yamaguchi; Yasuhiro Tanaka, both of Kokubu, Japan

[73] Assignee: Kyocera Corporation, Kyoto, Japan

[21] Appl. No.: 08/940,239

[22] Filed: Sep. 30, 1997

[30] Foreign Application Priority Data

| | | | |
|---|---|---|---|
| Sep. 30, 1996 | [JP] | Japan | 8-258152 |
| Dec. 26, 1996 | [JP] | Japan | 8-349031 |
| Dec. 27, 1996 | [JP] | Japan | 8-351206 |
| Jan. 31, 1997 | [JP] | Japan | 9-019348 |

[51] Int. Cl.[7] .......... C04B 35/03; C04B 35/10; F16L 9/10

[52] U.S. Cl. .......... 428/34.4; 428/34.5; 428/213; 428/312.2; 428/332; 428/338; 428/702; 501/119; 501/120; 501/121; 501/127

[58] Field of Search .......... 428/34.4, 34.5, 428/36.92, 36.9, 220, 332, 338, 426, 702, 213, 312.2; 501/119, 120, 121, 127; 51/309

[56] References Cited

U.S. PATENT DOCUMENTS

| | | | |
|---|---|---|---|
| 3,311,482 | 3/1967 | Klingler et al. | 501/119 |
| 4,060,095 | 11/1977 | Kurita | 136/234 |
| 4,067,792 | 1/1978 | Semkina et al. | 204/400 |
| 4,135,538 | 1/1979 | Kurita | 136/234 |
| 4,211,624 | 7/1980 | Semkina et al. | 204/422 |
| 4,948,538 | 8/1990 | Wei et al. | 264/6 |
| 5,230,565 | 7/1993 | Aoki et al. | 374/185 |

FOREIGN PATENT DOCUMENTS

| | | |
|---|---|---|
| 51-71312 | 6/1976 | Japan . |
| 4094064 | 3/1992 | Japan . |
| 9040453 | 2/1997 | Japan . |
| 10-045463 | 2/1998 | Japan . |
| 315955 | of 0000 | U.S.S.R. . |

*Primary Examiner*—Rena L. Dye
*Attorney, Agent, or Firm*—Loeb & Loeb, LLP

[57] ABSTRACT

The present invention relates to a protection tube for protecting heaters and sensors used in melting furnace for reprocessing of incinerator ash, other melting furnace, and various other furnaces, the protection tube being excellent in resistance to heat and resistance to corrosion so as to be usable favorably for a long period. The heat- and corrosion-resisting protection tube is formed in a tubular body closed at an end, being composed of ceramics, and the ceramics have a softening point over 1700° C. in the air atmosphere, a three-point bending strength of 150 MPa or more at 1450° C., a resistance to heat shock of ΔT of 150° C. or more by water quenching method, and a mean grain size of 2 μm or more, having a composition of 50 mol % or more of $Al_2O_3$ and 50 mol % or less of MgO.

10 Claims, 5 Drawing Sheets

HEAT-AND CORROSION-RESISTING PROTECTION TUBE

FIELD OF THE INVENTION

The present invention relates to a protection tube for protecting heaters, sensors and others in various furnaces, such as incinerator, incinerator ash-retreating melting furnace and the like.

PRIOR ART

Refuse discarded from dwellings, buildings and factories is burnt in a municipal incinerator, and ashes collected from the incinerator and fly ashes from exhaust gases in the incinerator contain Si, Al, Fe, Ca, Mg, Mn, K, Na, Cl, S and other elements, and also contain heavy metals such Sn, Cd, and Pb, and further toxic substances such as dioxin and furan.

Hitherto, incinerator ashes burnt in municipal furnaces have been buried directly in a final disposal site, but the siting requirements for refuse burying have become stricter recently, and it is therefore difficult to find a refuse burying site. In addition, discharge of toxic pollutants such as dioxin and furan has been regulated strictly under the laws of many countries. Under such circumstances, measures of removing pollutants are searched. As a solution, there is an yearly increasing demand for a melting furnace for removing harmful matters by collecting and remelting incinerator ashes and fly ashes.

The residual incineration ashes from the incinerator are treated at a high temperature to be formed into slag, so that their volume is decreased to a half or quarter of their original volume, and moreover that dioxin and other toxic pollutants can be decomposed under the high heat condition. For this reason, the high temperature heating treatment in the melting furnace draws public attentions as a promising method.

In the heating treatment in a melting furnace, as shown in FIG. 2, incineration ashes 11 are dumped into a melting furnace 12, and are heated to 1300 to 1600° C. by an electric heater 2 as a heat source. The ashes 11 are then melted, and the fumes of volatile metal elements 13 contained in the ashes are evaporated. The fumes 13 are introduced from the furnace into a cooling system (not shown), in which the fumes are cooled rapidly to be formed into fine particles. The fine particles are collected with a filter 15 or the like to recover metal concentrate 16. In the meantime, toxic matters such as dioxin and furan are thermal-decomposed in the melting furnace to be harmless. The gases 17 passing through the filter are released into the atmosphere through a gas treating system. The residual molten slag in the melting furnace 12 is collected as glass-like granules 18 to be recycled for an effective purpose or to be buried in a land.

The heater 2 and a thermocouple 3 for temperature control are indispensable for this kind of melting furnace 12, in which the ashes 11 are melted to form slag and salts which fly as dust, or the vapor of which drift as fumes. To protect the heater 2 and the thermocouple 3 from such dust and fumes, the heater 2 and the thermocouple 3 are generally covered with protection tubes 1 formed of ceramics having resistance to heat and corrosion. As a material for such protection tubes 1, there is used a composite ceramics of MgO—$ZrSiO_2$—$Al_2O_3$ as disclosed, for example, in Japanese Laid-open Patent Publication No. 51-71312.

In the melting treatment, incinerator ashes are heated by the electric heater to 1300 to 1600° C., and the protection tubes 1 to be used in the melting furnace 12 are accordingly exposed to the molten salts and slag resulting from the ashes 11 or to their fumes. The oxides of Si, Al, Fe, Ca, Na and the like or their salts contained in these matters gradually corrode the ceramics composing the protection tubes 1, so that the ceramics gradually decomposes and deteriorates in strength. As a result, cracks and damages occur easily to decrease the durability of the tubes.

For example, the above-mentioned composite ceramics of MgO—$ZrSiO_2$—$Al_2O_3$ is improved in resistance to corrosion as compared with basic refractories as of magnesia base and magnesia chromite base, but it is still insufficient in resistance to corrosion for use in a protection tube which should be as durable as to be used for a long time of period.

There is a further problem that, while a protection tube is used for a long time under a high temperature condition, the tube sometimes causes creep deformation due to its own weight to come into contact with the heater or the thermocouple, so that it makes difficult to control the temperature, or the tube is often broken in process of heating or cooling in each periodic repair of the melting furnace.

In process of cooling or heating the protection tube, a large difference in temperature between the inside and the outside of the protection tube may break the ceramics-made protection tube. The ceramics is therefore required to have properties to withstand a large difference in temperature between the inside and the outside of the tube. In this point of view, it is needed to use for a protection tube such ceramics that can be resistant to heat shock.

When the thickness of the protection tube is increased to improve the lifetime of a protection tube, the difference in temperature between the inside and the outside of the tube increases in process of heating or cooling the tube, so that the protection tube may be broken due to a thermal stress, or that the thermal capacity of the protection tube may increase to make it difficult to control the furnace temperature. On the other hand, when the thickness of the protection tube is decreased, its lifetime may be shortened because of corrosion from the outside of the tube as mentioned above.

It is hence an object of the present invention to provide a protection tube having a high resistance to heat and a high resistance to corrosion so as to have durability to withstand the use in the heating elements or the like of an incinerator ash melting furnace, and particularly to provide a protection tube which is excellent in resistance to corrosion against dust and molten fine particles in a high temperature atmosphere in the melting furnace.

It is another object of the present invention to provide a protection tube which has high resistance to heat shock against a change in temperature in process of heating or cooling the melting furnace so that the tube can not be cracked easily.

It is a further object of the present invention to provide a protection tube which can be favorably balanced between its lifetime that terminates due to corrosion and its lifetime that terminates because of cracks resulting from a thermal stress in relation to the thickness of the protection tube in process of heating or cooling the same.

SUMMARY OF THE INVENTION

The heat- and corrosion-resisting protection tube of the present invention is formed in the shape of a tubular body of ceramics which has a closed one end, and it is improved in durability in a melting furnace by improving the properties of the ceramics so as to resist heat and corrosion.

The ceramics to be used has a softening point of 1700° C. or higher in the air by thermal mechanical analysis, a three-point bending strength of 150 MPa or more at 1450° C., resistance to heat shock of $\Delta T$ 150° C. or more by the water-quenching method, and a mean grain size of 2 $\mu$m or more.

For the protection tube of the present invention, the composition of the ceramics to be used is specified in order to impart the ceramics the necessary properties as mentioned above. Specifically, there is used in the present invention ceramics comprising as a main component at least one of alumina, magnesia spinel($MgAl_2O_4$) and magnesia. In particular, alumina-based or spinel-based ceramics are preferred, and the chemical composition of the ceramics which comprises as its main components 50 mol % or more of $Al_2O_3$ and 50 mol % or less of MgO is selected. For the ceramic structure for this chemical composition, either a single phase of alumina or a two-phase mixture of alumina and spinel is selected.

Further, the protection tube of the present invention is improved in both resistance to corrosion and resistance to heat shock by specifying the thickness of the tubular body in relation to its outside diameter as follows in view of the shape of the tubular body.

That is, the shape of the protection tube is so determined that the thickness T (mm) of the protection tube having outside diameter D may satisfy the following equation.

$$(D^{1/2}-1.8)/0.3 \geqq t \geqq (D^{1/2}+5.0)/7$$

Further, the protection tube of the present invention improved in resistance to corrosion from its surface by specifying the size and shape of pores formed in the surface of the exterior of the ceramics forming the protection tube. More specifically, it is preferable that the mean size of the pores in the outer surface of the ceramics is 20 $\mu$m or less, that the surface occupation rate of the pores is 10% or less, and that the aspect ratio is 5 or less.

Furthermore, the protection tube of the present invention is provided by firing alumina-based or spinel-based ceramics, and keeping its as-fired outside surface for the tube so as to use the surface substantially free from pores, so that the resistance to corrosion from the surface is improved.

BRIEF DESCRIPTION OF THE DRAWINGS

Hereinafter, the present invention will be described in more detail with reference to the accompanying drawings, in which.

EMBODIMENTS

Hereinafter, embodiments of the present invention will be described.

Figure 1:
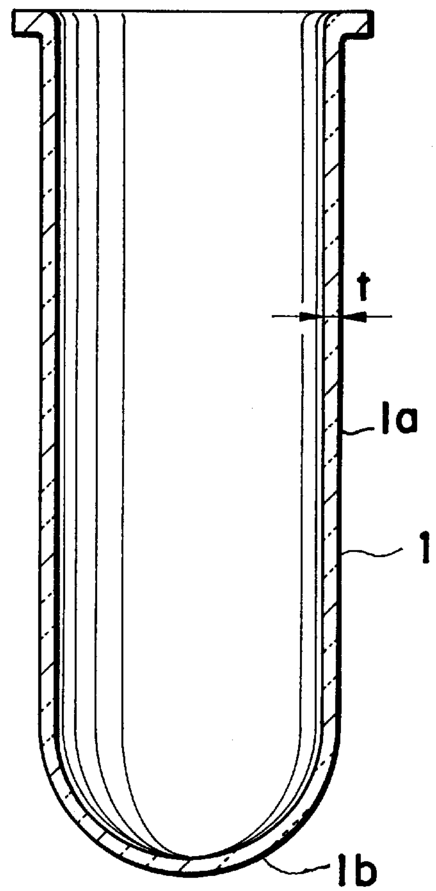
FIG. 1 is a sectional view of a protection tube according to an embodiment of the invention.

As shown in FIG. 1, a protection tube 1 of the invention is formed in the shape of a tubular body of ceramics, and the tubular body is closed at its one end, having a shape defined by smooth continuous curved faces between the cylindrical side wall of the body and the closed hemispherical one end portion.

Figure 2:
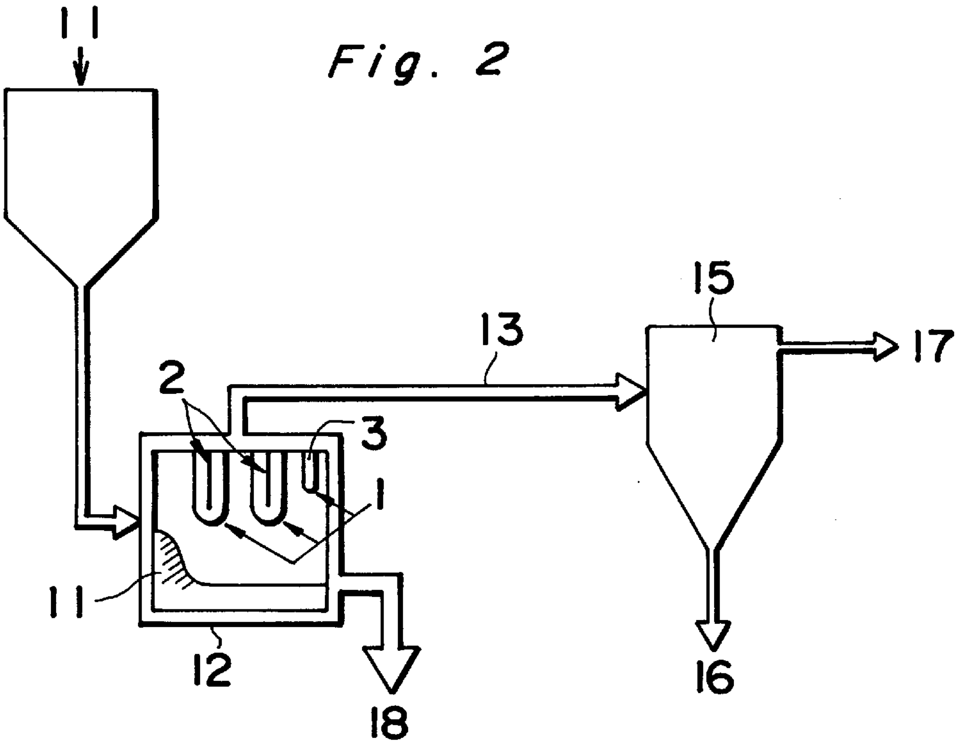
FIG. 2 is a schematic diagram showing an incinerator ash retreating system in which the heat and corrosion resisting protection tube of the present invention can be applied.

The protection tube 1 is, for example, as shown in FIG. 2, provided to cover the electric heater 2 or the thermocouple 3 for temperature measurement in the melting furnace 12 for an incinerator so as to protect them from the furnace atmosphere for the use for a long period of time.

The protection tube of the invention is composed of ceramics having a softening point of 1700° C. or higher in the air, a three-point bending strength of 150 MPa or more at 1450° C., resistance to heat shock of $\Delta T$ 150° C. or more by water-quenching method, and a mean grain size of 2 $\mu$m or more.

In the present invention, the softening point of the ceramics is 1700° C. or higher, so that thermal deformation can be effectively prevented when the ceramics is exposed for a long time to a temperature of 1300 to 1600° C. in the melting furnace. In this regard, the term "softening point" refers to deformation temperature as measured by thermal mechanical analysis. In the analysis, the softening point is determined by heating a ceramic piece in a heating oven while measuring a change in length of the ceramic piece accurately, and checking a temperature at which the length of the ceramic piece expanding at elevated temperatures decreases. This temperature means the lower limit temperature at which the ceramics cannot be used at a higher temperature, and if the ceramics has a softening point of 1700° C. or higher, it can be used in a range of 1300 to 1600° C.

The ceramics to be used has a three-point bending strength of 150 MPa or more at a temperature, for example, of 1450° C. The protection tube is attached on the furnace wall with its opening fixed directly or indirectly to the furnace wall to be supported thereon. The ceramics is therefore required to have a sufficient strength to hold its own weight. Thus, the ceramics must have a three-point bending strength of 150 MPa or more so as to ensure the strength of the protection tube at a high temperature.

The ceramics should have resistance to heat shock against temperature difference $\Delta T$ of 150° C. or more by water quenching method, and thereby, the ceramics can withstand a large temperature difference between the inside and the outside of the ceramic tube. Such resistance to heat shock brings about benefits of prevention of breakage of the protection tube due to a large temperature difference between inside and outside of the protection tube in process of cooling and then heating the furnace again in a periodic repair, and benefits of ensuring a high cooling speed and a high heating speed of the furnace temperature before and after the furnace repair.

In this regard, the term "temperature difference ΔT" by the heat shock resistance test refers to the temperature difference ΔT between the heating temperature and the water temperature obtained when the measured value of the bending strength decreases rapidly with the rise in heating temperature after a bar-shaped ceramic test piece of 3×3×40 mm has been kept at a specified temperature and then quenched in water of ordinary temperature in accordance with JIS C 2141.

Moreover, the ceramics to be used in the invention has a mean grain size of 2 μm or more. If the ceramics has a fine-grained structure in which the mean grain size of 2 μm or less, the corroding elements may infiltrate the ceramics from the surface through the grain boundary to permit the ceramics to have a lower melting point so as to decompose the ceramics. When the ceramics has a coarse grain size, it prevents the corroding matters in the furnace from infiltrating the ceramics, so that corrosion resistance of the ceramics can be improved.

The mean grain size of the ceramics is measured as follows. A ceramic test piece is subjected to thermal etching by holding at a temperature which is 100° C. lower than its firing temperature, or chemical etching by immersing in a corrosive liquid for a predetermined time so as to allow the grain boundary to appear. Then, its SEM photograph is taken, from the image of which the mean grain size is measured by the line intercept method. Three arbitrary lines are drawn on the scan type electron microscope (SEM) picture magnified by 1000 times, and the number of the grains crossing the line are intercepted by the length of the line segment, and the average of three lines is defined as a mean grain size.

The ceramics having such properties comprises as a main component at least one selected from alumina, magnesia spinel, and magnesia. Magnesia spinel is a compound expressed by chemical formula of $MgAl_2O_4$ or $MgO{\bullet}Al_2O_3$, and it is hereinafter referred to as spinel. Its typical example is a compound in which 1 mol of $Al_2O_3$ is bonded to 1 mol of MgO (71.4 wt. % of $Al_2O_3$ and 28.6 wt. % of MgO in weight ratio).

Preferably, such ceramics is selected that has a chemical composition comprising mainly 50 mol % or more of $Al_2O_3$ and 50 mol % or less of MgO, and more preferably the chemical composition has at least one of alumina phase and spinel phase. It is preferable that the ceramic structure of such a composition has an alumina single phase, a two-phase mixture of alumina phase and spinel phase, or a spinel single phase.

The above crystal phase can be easily analyzed by X-ray diffraction technique, and the crystal phase containing at least one of alumina and spinel can be confirmed by the presence of an X-ray diffraction peak corresponding to the one or more of the crystal phases. It is preferable that the peaks of other crystal phases should not substantially appear.

In this regard, in non-oxide ceramics mainly composed of silicon carbide SiC, silicon nitride $Si_3N_4$ or the like, Si or Ca in the main phase and the sintering aid component such as rare earth element are oxidized to be vitrified and the glassy matter starts to decompose the ceramic structure, when the ceramics is exposed to a temperature of 1500° C. or higher in an oxidizing atmosphere (air). The ceramics therefore has poor resistance to heat, and is unsuitable for use as a material for the protection tube 1. On the other hand, among oxide ceramics, ceramics mainly composed of zirconia is unsuitable for use as a material for the protection tube 1, because it causes a phase-transformation when exposed to a high temperature of 1500° C. or higher, and it declines in strength, and hence it is not suited as a material for the protection tube 1.

Magnesia is excellent in both heat resistance and corrosion resistance under specific conditions, but if there is a very small amount of moisture in the atmosphere or the ashes, magnesia reacts vigorously to form magnesium hydroxide, so that the corrosion resistance is impaired remarkably. Magnesia is therefore unsuitable as a material for the protection tube 1 to be used in a melting furnace which contains moisture substantially.

Magnesia-based ceramics is excellent in resistance to heat and corrosion and it can not be used for a protection tube. It is however better not to use a ceramic structure having a magnesia phase, because the magnesia-based ceramics reacts vigorously with the water content in the ashes or the moisture in the atmosphere under specified conditions when moist ashes are dumped into the furnace, so that magnesium hydroxide is formed to decline the corrosion resistance of the ceramics. Accordingly, it is preferable that the MgO content should not exceed the stoichiometric ratio for forming a spinel.

In the ceramics, preferably, the sum of $Al_2O_3$ and MgO is more than 95 wt. % and the sum of impurities such as $SiO_2$, CaO, $Na_2O$, and $Fe_2O_3$ is less than 5 wt. %. The components such as $SiO_2$ are not preferable because they form a low melting point glass in an alumina-based or spinel-based ceramics. Thus, ceramics comprising mainly alumina or spinel, and the limiting of the impurity content can surely have a softening point of 1700° C. or higher and resistance to heat shock of ΔT of 150° C. or more.

In order to control the amount of impurities to 5 wt. % or less, primary materials with high purity such as magnesia and alumina should be used, and also it is important to take care so as to prevent inclusion of impurities in process of manufacturing.

In another embodiment of the invention, the above ceramics comprising mainly alumina or spinel has, as described above, a mean grain size of 2 μm or more, and also a porosity of 3% or less. If the ceramics has a mean grain size of 2 μm or less, corrosive components in a high temperature atmosphere infiltrate the grain boundary to decline the bonding force between the crystal grains, so that the crystal grains drop from the ceramics to accelerate the corrosion. This phenomenon occur repeatedly to form through-holes, and finally to break or melt the protection tube.

The corrosive components easily penetrate the pores in the ceramics, and if the porosity is large, the penetration may proceed to the interior of the ceramics at a still higher speed than the infiltration to the grain boundary. The corrosion resistance of ceramics can be ensured by limiting the grain size to 2 μm or more and the porosity to 3% or less.

The porosity can be easily determined from the product of the water absorption calculated by the Archimedes principle and the bulk specific gravity.

One method of manufacturing the protection tube of the invention comprises the steps of preparing material powder of ceramics which is previously so blended as to obtain the above specified composition and the grain size distribution, compression-molding the material powder into a tubular body by the cold isostatic press (CIP) technique (usually the rubber press is employed), cutting its outer surface to form a specified shape, and firing to obtain a fired workpiece.

In a further embodiment of the invention, the shape of a protection tube of the invention is so defined that the tubular body of the protection can have an outside diameter D of 5 mm or more ($D \geqq 5$ mm), an inside diameter d of 1 mm or more ($d \geqq 1$ mm), and such a thickness t (mm) that satisfies the following equation:

$$(D^{1/2}-1.8)/0.3 \geqq t \geqq (D^{1/2}+5.0)/7 \quad (1)$$

This equation (1) was obtained experimentally, from which it was found out that the thickness t is preferably increased linearly to $D^{1/2}$ from both sides of a crack due to the corrosion and heat shock crack as the outside diameter D is increasing. The thickness t (mm) is specified to this range because the lifetime of the tube which terminates due to corrosion decreases while the tube is used under the condition of $t<(D^{1/2}+5.0)/7$, and because the temperature difference between the inside and the outside of the tube may increase in process of heating or cooling under the condition of $(D^{1/2}-1.8)/0.3<t$, resulting in a higher possibility of breaking the tube.

Even if the tube is formed in the above-specified ranges, a protection tube having a larger thickness or heavier weight due to its large-size dimensions is difficult to be supported in a furnace because of its own weight. On the other hand, a protection tube having a thinner wall is liable to break in handling, and therefore it is preferable to satisfy the following relationship:

$$(D^{1/2}-1.4)/0.7 \geqq t \geqq (D^{1/2}+1)/3 \quad (2)$$

Figure 5A:
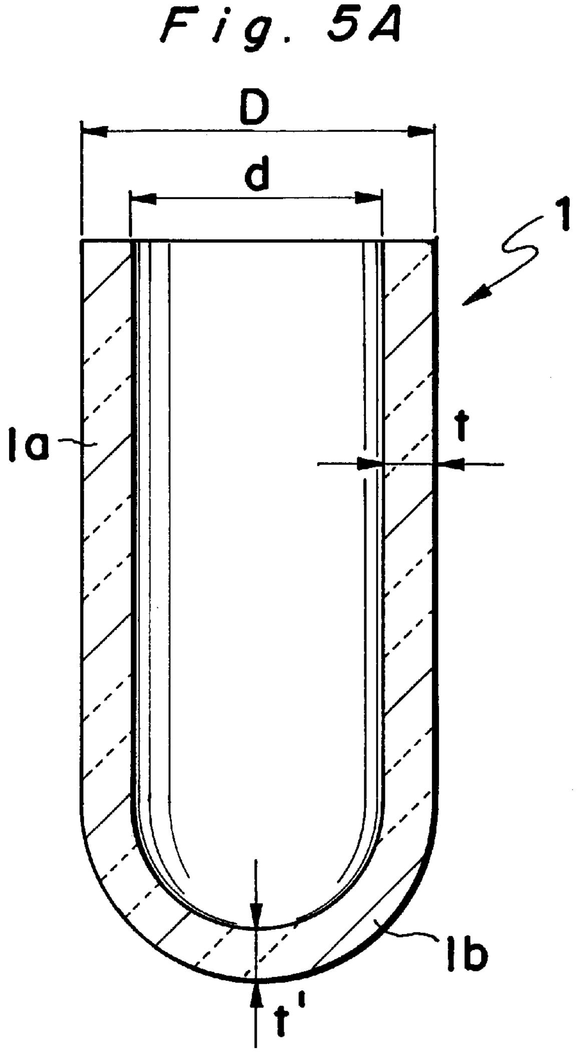
FIG. 5A is a sectional view of a protection tube in accordance with another embodiment of the present invention.

In the above two equations, 't' is the thickness of the side wall 1*a* near the opening of the protection tube or the thickness of the middle of the closed end portion 1*b* of the tube in FIG. 5A. It is favorable that the thickness of the tubular body as a whole is specified in the range of the above equations.

Figure 5B:
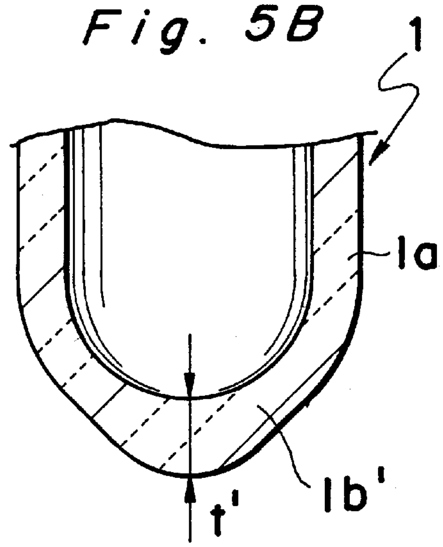
FIG. 5B is an enlarged partial sectional view of the closed one end of the protection tube.

When the thickness as a whole is within the range of the above equation, the middle of the closed end portion 1*b*' of the tube can have a larger thickness than the side wall as shown in FIG. 5B. In particular, when the protection tube is suspended from the ceiling of the furnace, the thickness of the side wall is decreased to reduce the entire weight, so that the load on the tubular body can be decreased, and also the thickness of the closed end portion of the tube which must have a highest corrosion resistance is increased so as to ensure a high corrosion resistance with a relatively light weight, and also to be effective to prevent the tube from breaking in handling.

The protection tube of the invention is preferably formed in the shape of tubular body having smooth curved surfaces between the closed end portion and the side wall. If there is any sharp corner, edge or notch between the closed end portion and the side wall, cracks easily occur at these portions because of concentration of stresses. The smooth curved surface means that the surface has no sharp corner, edge or notch.

The closed end portion may be formed in various shapes other than hemisphere, but it is preferable that it has a smooth curved surface, or a surface having a flat plane smoothly continuing to curved faces.

The opening of the protection tube may be, as shown in FIG. 5A, in the shape of a straight tube, or it may be provided with a flange as shown in FIG. 1, or it has such a thickness that is gradually increased toward the opening end (not shown).

In a further embodiment of the protection tube of the invention, it is preferable that the mean size of the pores in the surface layer of the ceramics is 20 μm or less, that the occupation rate of the pores is 10% or less, and that the mean aspect ratio of the pores is 5 or less.

The occupation rate of the pores is the rate of the total area occupied by the pores opened in the mirror-like polished surface layer of the outer side of ceramics to the area of the polished surface. The value of the occupation rate of the pores is determined as the surface area rate of the pores to the area of $2.25\times10^5$ $\mu m^2$ of the polished surface in the viewing field where they are observed by an optical microscope. The mean aspect ratio of the pores is determined as a ratio of the longitudinal length to the lateral length of a pore opened in the mirror-like polished surface. The value of the aspect ratio is give as follows: an SEM photograph of the mirror-like polished surface is taken at a magnification of 1000 times, 10 pores are sampled arbitrarily from the photograph, the aspect ratio of each pore is calculated from the shape, and the resulting aspect ratios are averaged.

Figure 7A:
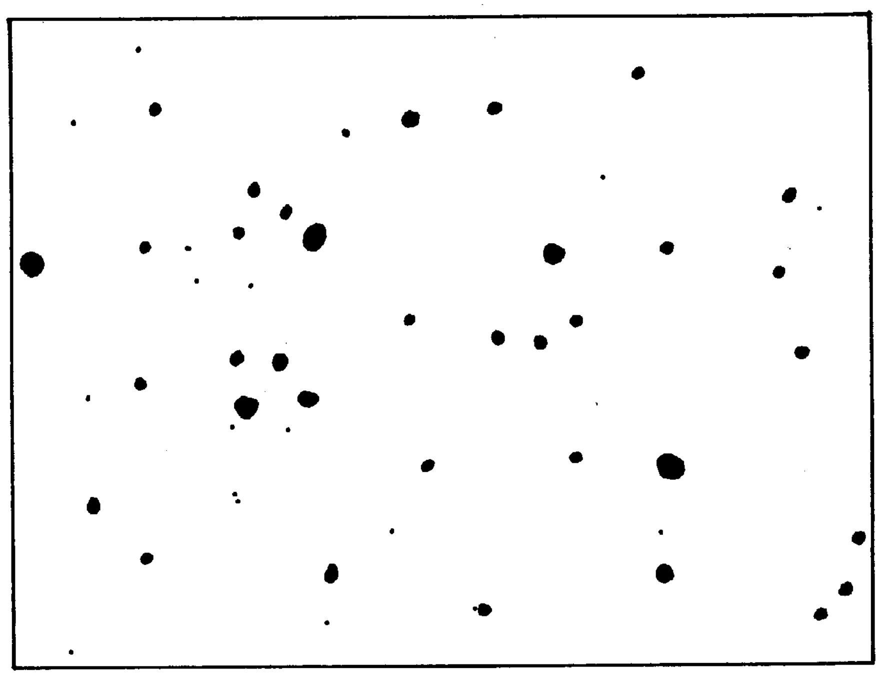
FIG. 7A is a schematic diagram which shows SEM photographic image of the ceramic section for depicting the pore distribution in the surface of the ceramics.
Figure 7B:
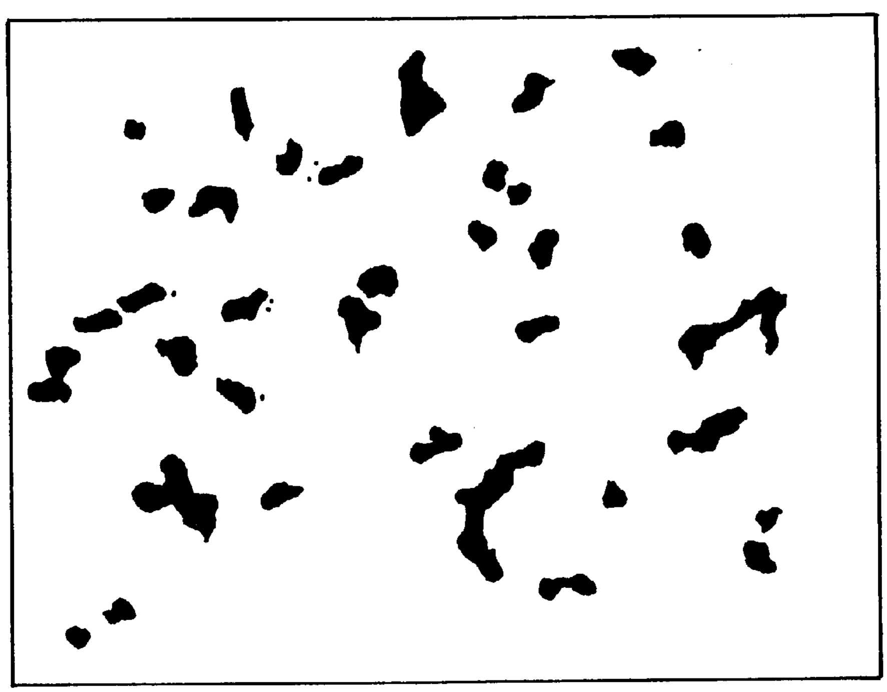
FIG. 7B is a similar schematic diagram for depicting the pore distribution having a large aspect ratio as in FIG. 7A.

FIG. 7A shows a schematic SEM photographic image in which the average aspect ratio is 1.2, and FIG. 7B shows the pores having an aspect ratio of 6.6. In both diagrams, the black spots indicate the pores.

The corrosive components generally infiltrate the surface layer of the ceramics through the grain boundary from the surface of the ceramics in a melting furnace, and the filtration further proceeds while separating the grains, and the corrosive components move further into the spaces of the pores in the surface layer of the ceramics for further corrosion. In the present invention, the size of pores is decreased to decrease the surface occupation rate so as to limit the aspect ratio to 5 or less. The routes of corrosion are therefore decreased, so that the corrosion is prevented to improve the resistance to corrosion.

The pores are thus limited because pores having an average size of 20 μm or more increase the infiltrating speed of the corrosive components in the atmosphere of the melting furnace, so that the possibility of corroding the ceramics increases. If the average size of pores is decreased, the local frequency of corrosion increases when the pore occupation rate exceeds 10%, and if the pore occupation rate is decreased to 10% or less, the infiltrating speed of the corrosive components into pores increases because of the slender shape of the pores when the aspect ratio exceeds 5. By limiting the aspect ratio to 5 or less, the pores are rounded to prevent the corrosive components.

Ceramics forming this shape of protection tube 1 comprises as a mainly component alumina or spinel ($MgAl_2O_4$). To control the properties of the pores such as pore size, pore occupation rate and aspect ratio as mentioned above, the blending of alumina and magnesia as the starting materials of ceramics and the particle size distribution are adjusted and the firing temperature and time in process of firing are controlled.

Figure 5C:
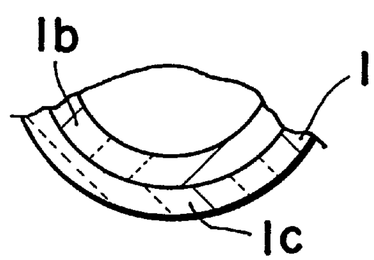
FIG. 5C is an enlarged partial sectional view of the closed two-layer one end of the protection tube.

The above properties of pores may be usually given to the thickness direction of the tubular body as a whole. It is also possible to impart the above pore properties only to the outer surface layer 1*c* of the tubular body as shown in FIG. 5C, so as to impart corrosion resistance to the ceramic outer surface. In this case, the inner surface layer 1*b* may be imparted heat shock resistance as a pore-rich structure. The tubular body having such two-layer structure is obtained by applying slurry on the porous ceramic tube having the inner surface layer 1*b* prepared first to form the outer surface layer 1*c*, and then firing it.

In a further embodiment of the invention, the outer surface of ceramics forming a protection tube 1 may be an as-fired surface. Ceramics having such an as-fired surface should preferably comprise 50% or more of $Al_2O_3$ and 50% or less of MgO as main components.

In the conventional process of manufacturing the protection tube 1, the outer surface of the tube is polished with a diamond wheel or by lapping after firing. The protection tube 1 of the invention can be used directly as an as-fired surface after firing without conducting any grinding or polishing on the outer surface.

In the invention, it is found that the corrosion resistance is excellent in the as-fired surface rather than the outer surface of ceramics ground and polished after firing. This is because of the following three reasons to be considered.

First, the surface of ceramics after fired has less pores or less voids than the inside of the ceramics, and grinding or polishing will remove the surface layer to allow appearing of the internal pores. That is, the as-fired surface has less pores than a ground or polished surface. Besides, the corrosive components in the furnace atmosphere infiltrate the ceramics from the pores, so that, when the as-fired surface is used directly as the outer surface 1*a* of the protection tube 1, infiltration of the corrosive components can be prevented because of less pores. The corrosion resistance can be thus improved.

Secondly, in oxide ceramics, ceramics after fired has a tendency to have grains of a larger size in the surface layer than in the inside, and therefore the as-fired surface is more advantageous to have a larger grain size. Because the corrosive components infiltrate the ceramics from the grain boundary, infiltration of the corrosive components can be prevented when the as-fired surface is used directly as the outer surface 1*a* of the protection tube 1, so that the surface has a larger grain size to lessen the grain boundary. Thus, the corrosion resistance can be improved.

Thirdly, when the ceramic surface is ground or polished after firing, the surface is damaged to have fine microcracks, from which the corrosive components easily infiltrate the ceramics. Therefore, when the as-fired surface is used directly as the outer surface 1*a* of the protection tube 1, the above microcracks do not occur, so that infiltration of the corrosive components can be prevented to improve the corrosion resistance.

As mentioned above, the protection tube 1 of the invention is excellent in corrosion resistance, and the manufacturing can be carried out simply and at a lower cost, since there is no need to grind or polish the surface layer 1*a*.

It can be easily checked whether or not the outer surface 1*a* is an as-fired surface, from an enlarged photograph of the surface by an electron microscope or the like. That is, a ground surface has grinding stripes, and a polished surface has a flat plane without undulation, while the as-fired surface, it is confirmed, has undulation because of the crystals orientated like a stone wall. Thus, the as-fired surface can be clearly distinguished because of the absence of grinding stripes.

In manufacturing the protection tube 1 of the invention, it is preferable to fire ceramics at a temperature higher than the intrinsic fully densifying temperature in order to increase the grain size of the outer surface 1*a*. It is more preferable to fire the ceramics for 2 or more hours at a temperature 50 to 100° C. higher than the fully densifying temperature. The outer surface 1*a* of the protection tube 1 thus obtained has large crystals with a mean grain size of 30 $\mu$m or more, and therefore it is substantially free from pores.

The protection tubes of the invention described above are excellent in durability to withstand the use in a melting furnace for retreating incinerator ashes for a long period of time stably. The protection tubes of the invention can be used also in various melting furnaces such as metal melting furnaces for protecting heaters and sensors. They can be used further in various furnaces such as a refuse incinerator and ceramic firing furnace, and also in other systems which are used in a high temperature and corrosive atmosphere.

Experiment 1

Heat resistance of test pieces was evaluated in the environments of incinerator ash reprocessing melting furnace.

First, using ceramics materials differing in purity as shown in Table 1, small test pieces in the shape of protection tube 1 as shown in FIG. 1 (outside diameter 40 mm×inside diameter 34 mm×150 mm) were fabricated. These test pieces were heated in a melting furnace 12 for incinerator ash reprocessing for 50 hours at 1450° C. Then the warp of test pieces was measured. Before and after the heat treatment test, if the warp was worse by 50% or more, it was judged to be deformation. Results are shown in Table 1, in which "x" indicates deformation, and "o" shows no deformation. These materials were cut in test pieces measuring 3×3×15 mm, and the softening temperature was measured by TMA test apparatus. Results are also shown in Table 1.

Considering from these results, alumina of low purity and material of low softening point such as $SiO_2$ were deformed (partly melted) by heat treatment, and were found to be improper as the material for the protection tube 1. By contrast, the materials of softening point of 1700° C. or higher were free from deformation, and were confirmed to be proper as the material for the protection tube 1.

TABLE 1

| | Material | | | | |
|---|---|---|---|---|---|
| Purity (%) | $Al_2O_3$ (99%) | $Al_2O_3$ (92%) | MgO spinel (99%) | MgO (99%) | $SiO_2$ (99%) |
| Softening point (° C.) | 1700 | 1500 | 1820 | 1900 or higher | 1400 |
| Deformation | o | x | o | o | x |
| Judgement | o | x | o | o | x |

Experiment 2

Assuming the situation of heating and cooling in periodic repair of incinerator ash melting furnace, test pieces were heated in various heating and cooling conditions.

Using several ceramics shown in Table 2, protection tubes 1 were fabricated in the outside diameter of 180 mm, inside diameter of 160 mm, and length of 800 mm, and were used as test pieces.

The test pieces were heated in various heating and cooling conditions as shown in Table 2 in the incinerator ash melting furnace 12, in three cycles of 1450° C.×2 hours heating followed by air cooling. After the test, the appearance of test pieces was visually observed for crack. Further, the cut section of test pieces was observed by SEM for crack.

Results are shown in Table 2, in which "x" shows presence of damage or crack, and "○" shows absence thereof.

At the same time, JIS strength test pieces (3×4×40 L) were presented for underwater immersion test, and the heat shock resistance ΔT was measured. The testing method is as follows. A test piece kept at high temperature ($T_1$) is quenched by putting into water at room temperature ($T_0$). The bending strength of test piece after quenching is measured, a characteristic curve of strength and cooling temperature difference $T_1-T_0$ is prepared, and the temperature difference showing sudden drop of strength is expressed as ΔT.

As a result, it was confirmed that even a material of small ΔT such as $SiO_2$ can be used in actual furnace environments by extending the heating and cooling time. In actual furnace environments, however, since sudden temperature drop due to unexpected power failure may be assumed, practically, $SiO_2$ which broken in air cooling process is not suited. The material with heat shock resistance of ΔT 150 or more should be at least required, and alumina, spinel, and magnesia are found to be suitable.

TABLE 2

| Heating time | Cooling time | Material | | | |
|---|---|---|---|---|---|
| (h) | (h) | Alumina | Spinel | Magnesia | Silica |
| 5 | Air cooling | o | x | x | x |
| 10 | Air cooling | o | o | o | x |
| 20 | 20 | o | o | o | x |
| 40 | 40 | o | o | o | o |
| Heat shock resistance ΔT (°C.) | | 200 | 160 | 160 | 100 |

Experiment 3

Reaction between test pieces of spinel ceramics differing in material strength and incinerator ash was First, as the incinerator ash, residual ash composed of Si, Al, Fe, Ca, K, Mn, Cl, S, Na, Pb, Zn, etc. was collected from incinerator, and tablets of 12 mm diameter×1 mm thickness, weighing 0.3 g, were prepared by dry pressure forming.

From several spinel ceramics differing in material strength obtained by grain size adjustment of primary materials of two types of spinel differing in mean particle size, test pieces of 30 mm in diameter and 10 mm in thickness were fabricated. Incinerator ash tables were put on test pieces, and heated in the atmosphere for 50 hours at 1450° C.

Swelling was investigated by comparing the outside diameter of the test piece measured before and after heating test. Besides, in the cut section of test pieces, Si, Fe, Ca and Na were detected by EPMA, and reaction layers of these elements were investigated. Results are shown in Table 3.

In the table, as for swelling, when the outside diameter was increased by 0.1% or more, it was judged to be Swelling and indicated by x-mark. In the EPMA findings, x-mark was given if a reaction layer of 0.5 mm or more was observed in at least one of the four elements.

As a result, in test pieces of low material strength indicated by C, D, E, that is, in test pieces having many voids, corrosion by these elements contained in the incinerator ash was noted, and the test pieces were swollen, and they were confirmed to be improper as the protection tube material. Although material E was not swollen, it had too many voids, and it is considered that all ash components penetrated into voids, not eroding into the grain boundary to cause swelling.

By contrast, in materials with high bending strength of 150 MPa or more indicated by A and B, that is, in test piece with less voids, swelling due to corrosion of ash components or reaction layer was not recognized, and they are found to be usable safely as the protection tube material.

TABLE 3

| Material | A | B | C | D | E |
|---|---|---|---|---|---|
| Bending strength (MPa) | 206 | 189 | 141 | 104 | 56 |
| Porosity (%) | 0 | 0.1 | 0.7 | 1.8 | 4.3 |
| Swelling | o | o | x | x | x |
| Reaction layer | o | o | x | x | x |
| Judgement | o | o | x | x | x |

Experiment 4

Assuming use in the environments of incinerator ash reprocessing melting furnace, the test was conducted to investigate reaction between incinerator ash and MgO spinel ceramics differing in mean grain size.

First, as the incinerator ash, residual ash containing Si, Al, Fe, Ca, K, Mn, Cl, S, Na, Pb, Zn, etc. was collected from incinerator, and tablets of 12 mm diameter×1 mm thickness, weighing 0.3 g, were prepared by dry pressure forming.

Then, as shown in Table 4, from MgO spinel ceramics differing in mean grain size obtained by varying the firing condition, test pieces of 30 mm in diameter and 10 mm in thickness were fabricated. Incinerator ash tables were put on test pieces, and heated in the atmosphere for 50 hours at 1450° C.

Swelling was investigated by comparing the outside diameter of the test piece before and after the test. Besides, in the cut section of test pieces, Si, Fe, Ca and Na were detected by EPMA, and reaction layers of these elements were investigated.

Results are shown in Table 4. In this experiment, same as in experiment 3, the results were judged by the same criterion and indicated by ○ and x marks.

As a result, in test pieces of small mean grain size indicated by materials A, B, F, G, corrosion by the elements contained in the incinerator ash was noted, and the test pieces were swollen, and they were found to be not suited as the material for the protection tube. By contrast, in the test pieces with mean grain size of 2 μm or more indicated by materials C, D, E, H, neither swelling due to corrosion of ash components nor reaction layer was observed, and they were confirmed to be suitable as the material for the protection tube.

TABLE 4

| Material | Spinel | | | | | Magnesia | | |
|---|---|---|---|---|---|---|---|---|
| Test pieces | A | B | C | D | E | F | G | H |
| Mean grain size (μm) | 0.6 | 1 | 2 | 5 | 9 | 0.4 | 1 | 3 |
| Swelling | x | x | ○ | ○ | ○ | x | x | ○ |
| Reaction layer | x | x | ○ | ○ | ○ | x | x | ○ |
| Judgement | x | x | ○ | ○ | ○ | x | x | ○ |

Experiment 5

Using a total of five types of ceramics, that is, MgO spinel, alumina and magnesia as ceramics of the invention, and spinel and magnesia with grain size of less than 2 μm as comparative examples, heater protection tubes of 180 mm in outside diameter, 160 mm in inside diameter, and 800 mm in length were fabricated, and used in actual operation in incinerator ash melting furnace, and the service life at temperature of 1450° C. was evaluated.

Results are shown in Table 5. In the comparative examples of spinel and magnesia, the protection tubes were broken at the observation point of 500 hours, whereas the protection tubes of spinel, alumina and magnesia of the embodiment of the invention were very small in corrosion and all right at the observation point of 1,000 hours. Thus, the protection tubes of the invention were proved to have a life of at least twice as long as that of protection tubes out of the scope of the invention in the incinerator ash reprocessing melting furnace.

TABLE 5

| Material | Spinel | Alumina | Magnesia | Spinel | Magnesia |
|---|---|---|---|---|---|
| Protection tube life (hours) | >1000 | >1000 | >1000 | <500 | <500 |
| Grain size ($\mu$m) | >2 | >2 | >2 | >2 | >2 |

Experiment 6

Assuming use in the environments of incinerator ash reprocessing melting furnace, the test was conducted to investigate reaction between incinerator ash and various ceramics.

First, as the incinerator ash, residual ash containing Al, Ca, Mg, Na, K, Zn, Pb, Si, Fe, Cl, etc. was collected from incinerator, and tablets of 12 mm diameter×1 mm thickness, weighing 0.3 g, were prepared by dry pressure forming.

Then, as shown in Table 6, from various ceramics, test pieces were fabricated in diameter of 30 mm and thickness of 10 mm, having a spot facing hole of 13 mm in diameter and 1 mm in depth for holding an incinerator ash tablet. In the ceramic test pieces, the characteristic values were measured and the reaction was tested as specified below.

1) Crystal phase

Using an X-ray diffraction apparatus, the conditions were voltage of 50 kV and current of 200 mA, using Cu as target, and the crystal phase was analyzed in the measuring range of 2θ=10 to 90°, in the full scale of $3\times10^4$ to $10\times10^4$ cps. As a result, the analyzed crystal phase was indicated by S (spinel) for $MgAl_2O_4$, P (periclace) for MgO, and C (corundum) for $Al_2O_3$.

2) Impurity

By ICP analysis, SiO2, CaO, $Na_2O$, and $Fe_2O_3$ were quantitatively analyzed, and the total amount of these components was determined.

3) Mean grain size

The mean grain size was measured by taking an SEM picture of fracture at magnification of 500 to 1000 times.

4) Bulk specific gravity, porosity, bending strength Tested and measured according to JIS C2141 methods. The bending strength was evaluated by three-point bending strength.

5) Reaction test

An incinerator ash tablet was put in a spot facing hole of each test piece, and heated for 50 hours in the atmosphere at 1550° C. After the test, the appearance of each test piece was visually observed to check for melting or crack. On the cut and ground section of each test piece, cracks were investigated by SEM of about 50 to 200 times, and moreover Si, Fe, Ca, Na, and K were detected by wavelength dispersion type EPMA, at acceleration voltage of 15 kV and probe current of $2.0\times10^{-7}$ A, and after mapping format output, the diffusion depth (reaction layer) of these elements was investigated.

Results are shown in Tables 6 and 7. In Table 7, presence of crack, melting or reaction layer is indicated by x-mark, and absence by o-mark.

As a result, melting or crack was observed in SiC, $Si_3N_4$, and $ZrO_2$ (Nos. 20 to 22), and they were known to be unsuited as protection tube.

On the other hand, even in the ceramics mainly composed of $Al_2O_3$ and MgO, in samples having crystal phase of MgO (Nos. 1 to 3), reaction layers with ash components were formed. Besides, in samples having impurities of 5 parts by weight or more and grain size of less than 2 $\mu$m (Nos. 9, 13, 17 to 19), reaction layers, melting, and cracks were detected.

By contrast, in the ceramics mainly composed of spinel or $Al_2O_3$, Nos. 4 to 8, 10 to 12, 14 to 16, melting and crack were not generated, and there was no reaction layer with ash components, and they are known to be preferably used as protection tube.

Figure 3:
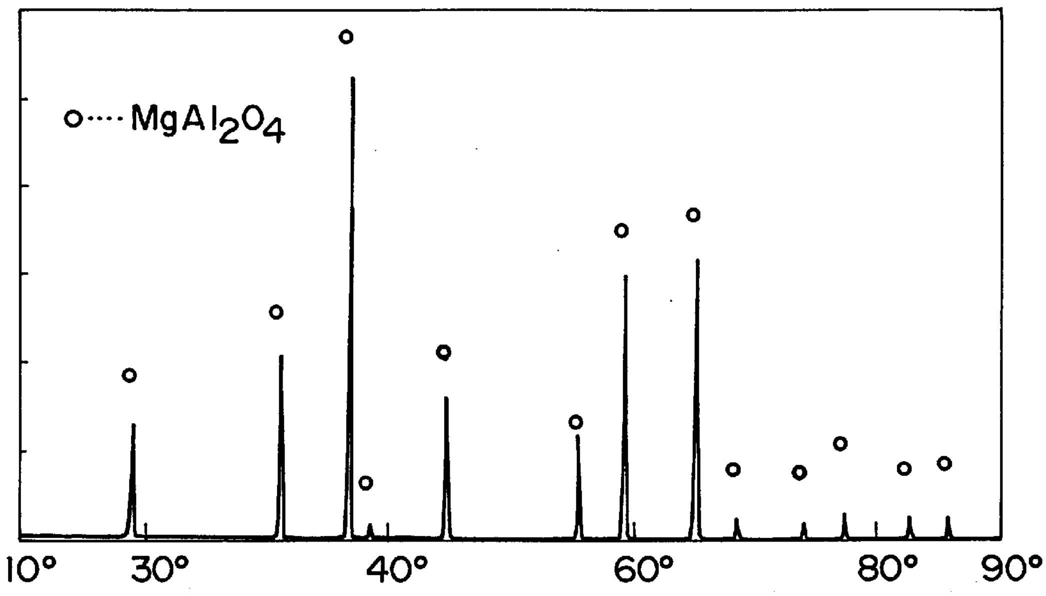
FIG. 3 is an X-ray diffraction chart of spinel-based ceramics to be used in forming a heat- and corrosion-resisting protection tube in accordance with the embodiment of the present invention.
Figure 4:
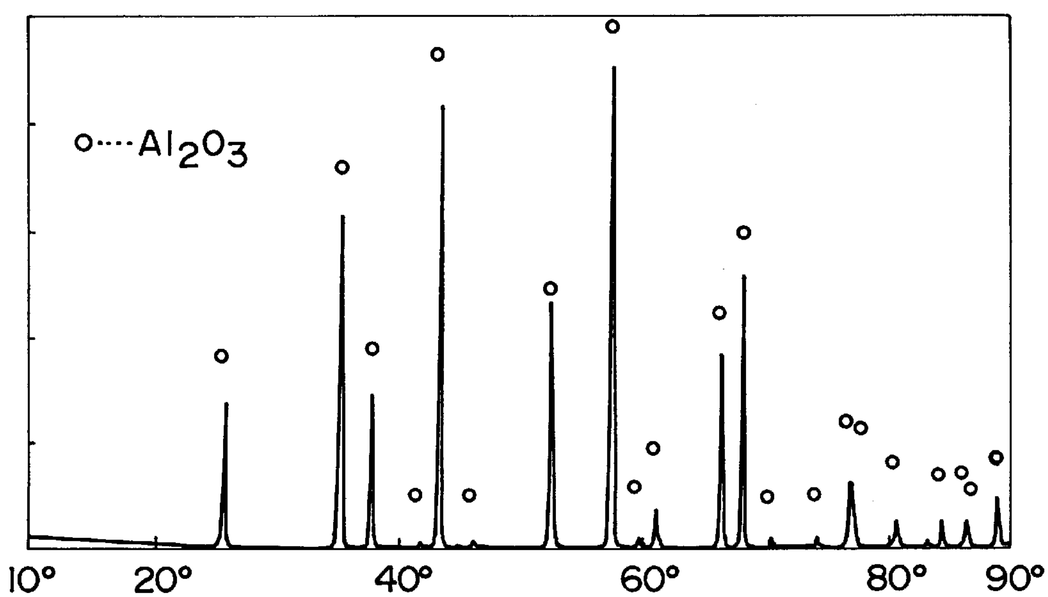
FIG. 4 is an X-ray diffraction chart of alumina based ceramics as in FIG. 3.

The X-ray diffraction charts of samples No. 4 and No. 16 are shown in FIGS. 3 and 4, respectively, in which only the peak of crystal phase of $MgAl_2O_4$ or $Al_2O_3$ was detected, peaks of other crystal phase did not exist.

TABLE 6

| No. | Composition of principal components (wt. %) MgO | $Al_2O_3$ | $MgO/Al_2O_3$ ratio by weight | Crystal phase | Impurities (parts by weight) | Grain size ($\mu$m) |
|---|---|---|---|---|---|---|
| 1 | 61 | 39 | 1.56 | S + P | 0.4 | 5 |
| 2 | 44 | 56 | 0.79 | S + P | 0.4 | 6 |
| 3 | 33 | 67 | 0.49 | S + P | 0.4 | 8 |
| 4 | 28.6 | 71.4 | 0.40 | S | 0.5 | 35 |
| 5 | 28 | 72 | 0.39 | S | 0.5 | 30 |
| 6 | 28 | 72 | 0.39 | S | 0.5 | 3 |
| 7 | 28 | 72 | 0.39 | S | 2.9 | 35 |
| 8 | 28 | 72 | 0.39 | S | 5.0 | 32 |
| 9 | 28 | 72 | 0.39 | S | 6.4 | 32 |
| 10 | 25 | 75 | 0.33 | S + C | 0.7 | 16 |
| 11 | 20 | 80 | 0.25 | S + C | 0.4 | 13 |
| 12 | 20 | 80 | 0.25 | S + C | 3.4 | 15 |
| 13 | 20 | 80 | 0.25 | S + C | 6.1 | 20 |
| 14 | 10 | 90 | 0.11 | S + C | 0.4 | 11 |
| 15 | 5 | 95 | 0.05 | S + C | 0.5 | 10 |
| 16 | 0 | 100 | 0 | C | 0.1 | 11 |
| 17 | 0 | 100 | 0 | C | 0.1 | 1 |
| 18 | 0 | 100 | 0 | C | 5.3 | 22 |
| 19 | 0 | 100 | 0 | C | 9.1 | 45 |
| 20 | $ZrO_2$ | | — | — | 4 | 1 |
| 21 | SiC | | — | — | 4 | 7 |
| 22 | $Si_3N_4$ | | — | — | 10 | 5 |

TABLE 7

| No | Bulk specific gravity | Porosity (%) | Bending strength (kg/mm$^2$) | Melting, crack | Reaction layer | Evaluation |
|---|---|---|---|---|---|---|
| 1 | 3.49 | 0.1 | 16 | ○ | x | x |
| 2 | 3.49 | 0.1 | 17 | ○ | x | x |
| 3 | 3.48 | 0 | 16 | ○ | x | x |
| 4 | 3.53 | 0 | 20 | ○ | ○ | ○ |
| 5 | 3.53 | 0 | 19 | ○ | ○ | ○ |
| 6 | 3.48 | 0.1 | 16 | ○ | ○ | ○ |
| 7 | 3.48 | 0.1 | 15 | ○ | ○ | ○ |
| 8 | 3.44 | 0.3 | 12 | ○ | ○ | ○ |
| 9 | 3.43 | 0.3 | 12 | ○ | x | Δ |
| 10 | 3.52 | 0.1 | 19 | ○ | ○ | ○ |
| 11 | 3.61 | 0 | 22 | ○ | ○ | ○ |
| 12 | 3.50 | 0.5 | 12 | ○ | ○ | ○ |
| 13 | 3.45 | 3.1 | 8 | ○ | x | Δ |
| 14 | 3.73 | 0 | 25 | ○ | ○ | ○ |
| 15 | 3.80 | 0 | 27 | ○ | ○ | ○ |
| 16 | 3.90 | 0 | 32 | ○ | ○ | ○ |
| 17 | 3.91 | 0 | 50 | ○ | x | Δ |
| 18 | 3.83 | 0 | 31 | x | — | Δ |
| 19 | 3.80 | 0 | 27 | x | — | Δ |
| 20 | 6.00 | 0 | 99 | x | — | x |
| 21 | 3.20 | 0 | 55 | x | — | x |
| 22 | 3.20 | 0 | 60 | x | — | x |

Experiment 7

Using ceramics of No. 3, No. 4 and No. 16 in Tables 6 and 7 in experiment 6, protection tubes 1 of 180 mm in outside diameter, 160 mm in inside diameter, 800 mm in length, and 10 mm in thickness t as shown in FIG. 1 were fabricated, and tested in actual operation in the incinerator ash melting furnace 12 shown in FIG. 2, and the life at temperature of 1500° C. was investigated. The life was expressed by the hours until crack or through-hole was formed in the protection tube 1 due to corrosion when exposed to actual furnace environments.

Results are shown in Table 8. In comparative example No. 3 of ceramics mainly composed of MgO+MgO spinel, the life was 1000 hours. By contrast, in No. 4 and No. 16 of ceramics mainly composed of MgO spinel or $Al_2O_3$, the life was extended to more than 2000 hours.

TABLE 8

| | Composition of principal components (wt. %) | | Crystal | Life of protection tube |
|---|---|---|---|---|
| No | MgO | $Al_2O_3$ | phase | (hours) |
| 3 | 33 | 67 | MgO + $MgAl_2O_4$ | Approx. 1000 |
| 4 | 28.6 | 71.4 | $MgAl_2O_4$ | 2000 or more |
| 16 | 0 | 100 | $Al_2O_3$ | 2000 or more |

Experiment 8

From ceramics mainly composed of $Al_2O_3$ and spinel, protection tubes 1 having a flange at the opening were fabricated in various dimensions as shown in Tables 9 and 10. The protection tubes 1 were suspended from the ceiling of the incinerator ash melting furnace, with the closed end portion 1*b* directed to the molten slag side, the opening of the protection tubes 1 was sealed by a furnace material, and the protection tubes were exposed to actual environments by heating from ordinary temperature to 1400° C. in 48 hours, holding for 500 hours, and then cooling down.

After the test, the appearance of each protection tube 1 was checked to observe for deformation and crack visually, and evaluated by x or ○ mark. Moreover, the middle part of the closed end portion 1*b* of the protection tube 1 was cut off, and degree of corrosion was visually observed, and the depth of corrosion was measured by EPMA. By the ratio of corrosion depth and wall thickness, the performance was evaluated as shown in Tables 11 and 12.

Figure 6:
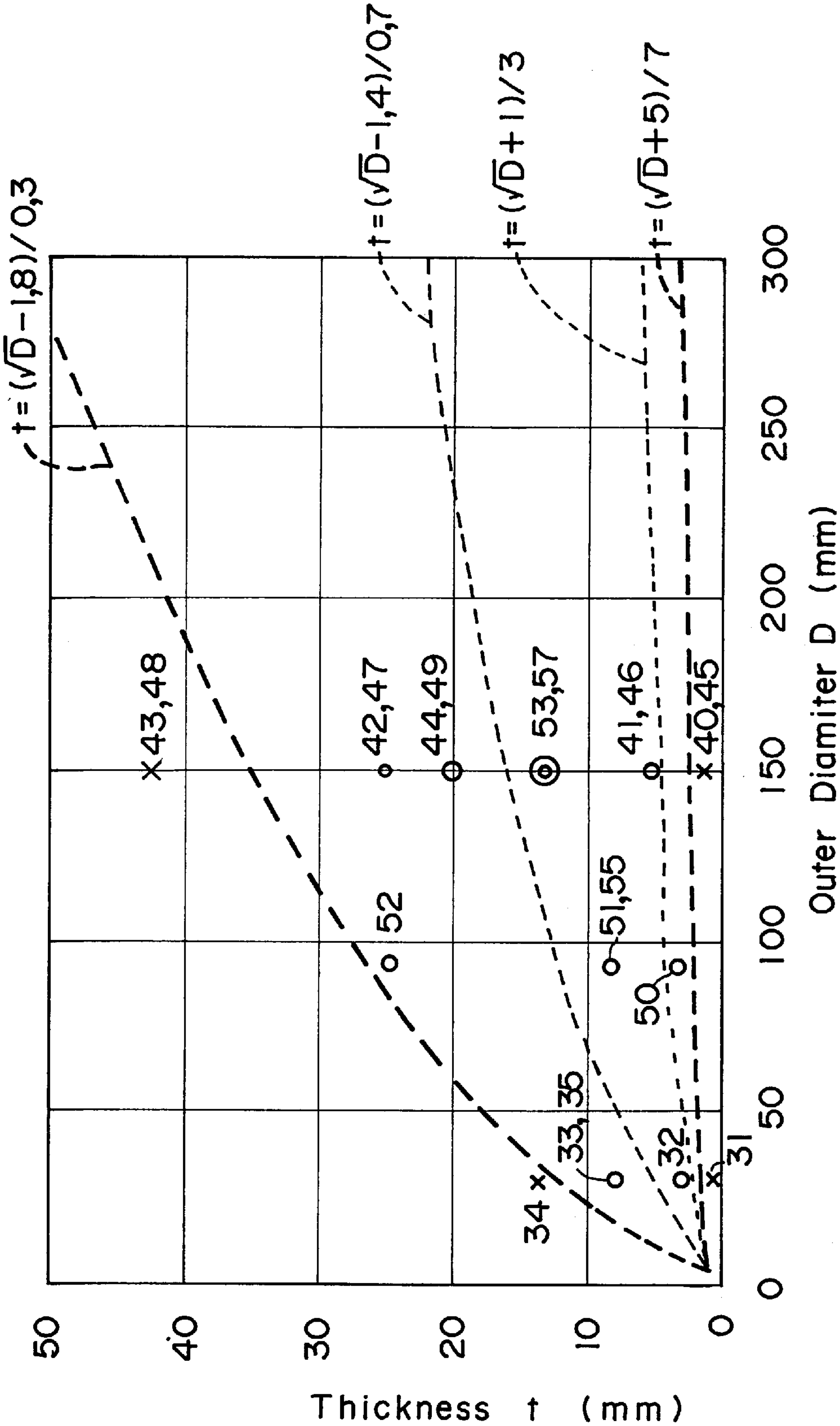
FIG. 6 is a graph showing a relationship between the thickness t and the outside diameter D of the heat- and corrosion-resisting protection tube, in which the numerals indicate the numbers of test pieces.

Results are shown in Tables 11, 12 and FIG. 6. In FIG. 6, data of each test piece is plotted, in which marks are same as shown in the remarks of Tables 11 and 12. As known from the diagram, a favorable tubular body thickness t at which corrosion of the tubular body is relatively small depends on the outside diameter D of the tubular body, and the upper limit of t is defined as $$t=(D^{1/2}-1.8)/0.3$$

while the lower limit of t is indicated as $$t=(D^{1/2}+5.0)/7$$

Hence, formula (1) was obtained. That is, $$(D^{1/2}-1.8)/0.3 \geqq t \geqq (D^{1/2}+5.0)/7 \quad (1)$$

Moreover, in FIG. 6, as a further preferable range, the range of thickness t indicated by formula (2) is expressed in a fine broken line. That is, $$(D^{1/2}-1.4)/0.7 \geqq t \geqq (D^{1/2}+1.0)/3 \quad (2)$$

Considering from these results, in the samples of which wall thickness t is smaller than the range specified in formula (1) (Nos. 31, 40, 45, etc.), being unable to support the own weight at high temperature, deformation was induced, or corrosion infiltrated inside to lead to breakdown. These protection tubes 1 seem to be broken due to partly corrosion and corrosion, being unable to withstand the stress when the surface layer was swollen.

On the other hand, when the wall thickness t was larger than the range in formula (1) (Nos. 34, 43, 48, etc.), corrosion propagated from the crack which was estimated to be caused in the heating process.

In Nos. 36 to 39, moreover, since the closed end portion 1*b* was flat and the boundary with the side surface 1*a* was an edge, cracks were formed in the edge, and they were improper as protection tube 1.

By contrast, when the closed end portion 1*b* was a smooth hemispherical shape continuous to the side surface 1*a*, and the wall thickness t was in a range of broken line in FIG. 6, although a slight corrosion was noted on the surface layer, no crack was detected, and they were confirmed to have a sufficient life as protection tube.

TABLE 9

| | | Dimensions (mm) | | | | |
|---|---|---|---|---|---|---|
| No | Material | Outside diameter $d_1$ | Thickness of side wall t | Thickness of closed end portion t' | Height | Shape of closed end portion |
| 31 | MgO spinel | 30 | 1 | 1 | 120 | Hemi-spherical |
| 32 | ↑ | ↑ | 3 | 3 | ↑ | ↑ |
| 33 | ↑ | ↑ | 8 | 8 | ↑ | ↑ |
| 34 | ↑ | ↑ | 13 | 13 | ↑ | ↑ |
| 35 | ↑ | ↑ | 3 | 8 | ↑ | ↑ |
| 36 | ↑ | ↑ | 1 | 1 | ↑ | Flat |
| 37 | ↑ | ↑ | 3 | 3 | ↑ | ↑ |
| 38 | ↑ | ↑ | 8 | 8 | ↑ | ↑ |
| 39 | ↑ | ↑ | 13 | 13 | ↑ | ↑ |
| 40 | ↑ | 150 | 2 | 2 | 400 | Hemi-spherical |
| 41 | ↑ | ↑ | 5 | 5 | ↑ | ↑ |
| 42 | ↑ | ↑ | 25 | 25 | ↑ | ↑ |
| 43 | ↑ | ↑ | 42 | 42 | ↑ | ↑ |
| 44 | ↑ | ↑ | 5 | 20 | ↑ | ↑ |
| 45 | $Al_2O_3$ | ↑ | 2 | 2 | ↑ | ↑ |
| 46 | ↑ | ↑ | 5 | 5 | ↑ | ↑ |
| 47 | ↑ | ↑ | 25 | 25 | ↑ | ↑ |

TABLE 9-continued

| No | Material | Dimensions (mm) Outside diameter $d_1$ | Thickness of side wall t | Thickness of closed end portion t' | Height | Shape of closed end portion |
|---|---|---|---|---|---|---|
| 48 | ↑ | ↑ | 42 | 42 | ↑ | ↑ |
| 49 | ↑ | ↑ | 5 | 20 | ↑ | ↑ |

TABLE 10

| No | Material | Dimensions (mm) Outside diameter $d_1$ | Thickness of side wall t | Thickness of closed end portion t' | Height | Shape of closed end portion |
|---|---|---|---|---|---|---|
| 50 | MgO spinel | 90 | 3 | 3 | 300 | Hemi-spherical |
| 51 | ↑ | ↑ | 8 | 8 | ↑ | ↑ |
| 52 | ↑ | ↑ | 25 | 25 | ↑ | ↑ |
| 53 | ↑ | 150 | 13 | 13 | 400 | ↑ |
| 54 | $Al_2O_3$ | 90 | 3 | 3 | 300 | ↑ |
| 55 | ↑ | ↑ | 8 | 8 | ↑ | ↑ |
| 56 | ↑ | ↑ | 25 | 25 | ↑ | ↑ |
| 57 | ↑ | 150 | 13 | 13 | 400 | ↑ |

TABLE 11

| No | Deformation | Crack | Corrosion | Integrated evaluation |
|---|---|---|---|---|
| 31 | x | x | x | x |
| 32 | o | o | o | o |
| 33 | o | o | o | o |
| 34 | — | x | x | x |
| 35 | o | o | ◎ | o |
| 36 | x | x | x | x |
| 37 | o | o | Δ | x |
| 38 | o | x | x | x |
| 39 | — | x | x | x |
| 40 | x | o | x | x |
| 41 | o | o | o | o |
| 42 | o | o | o | o |
| 43 | — | x | x | x |
| 44 | o | o | ◎ | o |
| 45 | x | o | x | x |
| 46 | o | o | o | o |
| 47 | o | o | o | o |
| 48 | — | x | x | x |
| 49 | o | o | o | o |

Evaluation of corrosion
◎: Corrosion depth is 1/10 or less of wall thickness
o: Corrosion depth is 1/10 to 1/3 of wall thickness
Δ: Corrosion depth is about 1/3 of wall thickness
x: Corrosion depth is more than 1/3 of wall thickness

TABLE 12

| No | Deformation | Crack | Corrosion | Integrated evaluation |
|---|---|---|---|---|
| 50 | o | o | o | o |
| 51 | o | o | o | o |
| 52 | o | o | o | o |
| 53 | o | o | ◎ | ◎ |
| 54 | o | o | Δ | x |
| 55 | o | o | o | o |
| 56 | o | x | Δ | x |
| 57 | o | o | o | o |

Evaluation of corrosion
◎: Corrosion depth is 1/10 or less of wall thickness
o: Corrosion depth is 1/10 to 1/3 of wall thickness
Δ: Corrosion depth is about 1/3 of wall thickness
x: Corrosion depth is more than 1/3 of wall thickness Experiment 9

Assuming use in the environments of incinerator ash reprocessing melting furnace, test pieces of ceramics mainly composed of $Al_2O_3$ and MgO spinel were prepared, and the test was conducted to investigate reaction with incinerator ash.

First, as the incinerator ash, residual ash containing Al, Ca, Mg, Na, K, Si, Fe, Cl etc. was collected from incinerator, and tablets of 12 mm diameter×1 mm thickness, weighing 0.3 g, were prepared by dry pressure forming.

Then, as shown in Table 13, from various ceramics, tablet test pieces were fabricated in diameter of 30 mm and thickness of 10 mm, having a spot facing hole (13 mm in diameter and 1 mm in depth) for holding an incinerator ash tablet. In Nos.4 to 12 having only the crystal phase of $MgAl_2O_4$, although identical in composition, samples different in pore size were fabricated by mixing materials different in sintering property and grain size of primary material.

In each test piece, crystal phase, bulk specific gravity, porosity, bending strength, mean pore size, pore occupation rate, and pore aspect ratio were measured.

The crystal phase was identified by the X-ray diffraction in the same method as in experiment 6.

As for mean pore size and pore occupation rate, after mirror smooth polishing of the test piece surface, the measuring area $2.25\times10^5$ $\mu m^2$ was measured at magnification of 200 times by using a pore rate measuring instrument composed of metal microscope and image analyzer, and the mean pore size in this range and the pore occupation rate in this area were measured. As for the pore aspect ratio, a similarly mirror smooth polished surface was taken by scanning electron microscope (SEM) at magnification of 1000 times, and 10 arbitrary pores were selected from the picture, and the lengths in the longitudinal direction and lateral direction were measured to calculate the aspect ratio, and the average of 10 pores was calculated.

Consequently, an incinerator ash tablet was put in the spot facing hole of each test piece, and was heated in the atmosphere for 50 hours at 1550° C. After heating, the appearance of each test piece was visually observed to check for melting or crack. Besides, the test piece was cut off, and the polished section was observed by SEM (50 to 200 times) to check for crack, and moreover Si, Fe, Ca, Na, and K were detected by EPMA analysis system, at acceleration voltage of 15 kV and probe current of $2.0\times10^{-7}$ A, and after mapping format output, the diffusion depth of these elements was investigated.

Results are shown in Tables 13 and 14. In Table 14, presence of crack, melting or reaction layer is indicated by x-mark, and absence by ○-mark.

As a result, in samples having the mean pore size exceeding 20 $\mu$m, the pore occupation rate exceeding 10%, or pore aspect ratio more than 5 (Nos. 61 to 63, 70 to 72, 75), reaction layers were formed, and corrosive components were likely to infiltrate. By contrast, in Nos. 64 to 69, 73, 74, 76, neither melting loss nor crack was noted, and reaction layer with ash components was not found, and they known to be preferably usable as the protection tube 1 of melting furnace.

TABLE 13

| No. | Composition (wt.) MgO | $Al_2O_3$ | Crystal phase | Bulk specific gravity | Porosity (%) | Three-point bending strength ($kgf/mm^2$) |
|---|---|---|---|---|---|---|
| 61 | 61 | 39 | $MgAl_2O_4$ + MgO | 3.49 | 0.1 | 16 |
| 62 | 44 | 56 | ↑ | 3.49 | 0.1 | 17 |
| 63 | 33 | 67 | ↑ | 3.48 | 0.0 | 16 |
| 64 | 28 | 72 | $MgAl_2O_4$ | 3.53 | 0.0 | 19 |
| 65 | ↑ | ↑ | ↑ | 3.50 | 0.0 | 17 |
| 66 | ↑ | ↑ | ↑ | 3.50 | 0.0 | 17 |
| 67 | ↑ | ↑ | ↑ | 3.49 | 0.0 | 17 |
| 68 | ↑ | ↑ | ↑ | 3.47 | 0.0 | 17 |
| 69 | ↑ | ↑ | ↑ | 3.45 | 0.0 | 16 |
| 70 | ↑ | ↑ | ↑ | 3.41 | 0.0 | 16 |
| 71 | ↑ | ↑ | ↑ | 3.30 | 1.7 | — |
| 72 | ↑ | ↑ | ↑ | 3.28 | 14.8 | — |
| 73 | 25 | 75 | $MgAl_2O_4$ + $Al_2O_3$ | 3.52 | 0.1 | 19 |
| 74 | ↑ | ↑ | ↑ | 3.50 | 0.0 | 17 |
| 75 | ↑ | ↑ | ↑ | 3.30 | 15.0 | — |
| 76 | 0 | 100 | $Al_2O_3$ | 3.90 | 0.0 | 32 |

TABLE 14

| No | Mean pore size ($\mu$m) | Pore occupation rate (%) | Pore aspect ratio | Crack, melting loss | Reaction layer | Integrated evaluation |
|---|---|---|---|---|---|---|
| 61 | 25 | 21 | 1.3 | ○ | x | x |
| 62 | 33 | 27 | 1.4 | ○ | x | x |
| 63 | 40 | 5 | 1.3 | ○ | x | x |
| 64 | 16 | 3 | 1.2 | ○ | ○ | ○ |
| 65 | 9 | 2 | 1.5 | ○ | ○ | ○ |
| 66 | 9 | 2 | 1.9 | ○ | ○ | ○ |
| 67 | 10 | 2 | 2.1 | ○ | ○ | ○ |
| 68 | 12 | 3 | 2.8 | ○ | ○ | ○ |
| 69 | 19 | 3 | 4.3 | ○ | ○ | ○ |
| 70 | 25 | 4 | 6.6 | ○ | x | x |
| 71 | 17 | 6 | 5.1 | ○ | x | x |
| 72 | 48 | 23 | — | ○ | x | x |
| 73 | 17 | 2 | 1.8 | ○ | ○ | ○ |
| 74 | 10 | 2 | 1.9 | ○ | ○ | ○ |
| 75 | 40 | 26 | — | ○ | x | x |
| 76 | 15 | 6 | 2.1 | ○ | ○ | ○ |

Experiment 10

Using materials of No. 64 and No. 76 in Table 13 conforming to the embodiment and material No. 72 in Table 13 as comparative example, protection tubes 1 of 180 mm in outside diameter, 160 mm in inside diameter, 800 mm in length, and 10 mm in thickness t as shown in FIG. 1 were fabricated. The protection tube 1 was tested in actual operation in the incinerator ash melting furnace 12 shown in FIG. 2, and the life at temperature of 1500° C. was investigated. The life was expressed by the hours until crack or through-hole was formed in the protection tube 1 due to corrosion.

As shown in Table 15, by using the protection tube 1 small in all of mean pore size, occupation rate and aspect ratio, it was proved to be usable for 2000 hours in the incinerator ash melting furnace.

TABLE 15

| No | Crystal phase | Mean pore size ($\mu$m) | Pore occupation rate (%) | Pore aspect ratio | Life of protection tube (hours) |
|---|---|---|---|---|---|
| 64 | $MgAl_2O_4$ | 16 | 3 | 1.2 | 2000 or more |
| 72 | $MgAl_2O_4$ | 48 | 23 | — | 500 or less |
| 76 | $Al_2O_3$ | 15 | 6 | 2.1 | 2000 or more |

Experiment 11

Assuming use in the environments of incinerator ash reprocessing melting furnace, test pieces of ceramics mainly composed of $Al_2O_3$ and MgO spinel were prepared, and the test was conducted to investigate reaction with incinerator ash.

First, as the incinerator ash, residual ash composed of Al, Ca, Mg, Na, K, Si, Fe, Cl, etc. was collected from incinerator, and tablets of 12 mm diameter×1 mm thickness, weighing 0.3 g, were prepared by dry pressure forming.

Then, as shown in Table 16, after forming various ceramics by dry pressure forming, tablet test pieces were fabricated in diameter of 30 mm and thickness of 10 mm, having a spot facing hole (13 mm in diameter and 1 mm in depth) for holding an incinerator ash tablet, by firing in the ambient atmosphere at 1600 to 1750° C.

In each test piece, crystal phase, impurity content, mean grain size, bulk specific gravity, porosity, and bending strength were measured.

The crystal phase was identified by the X-ray diffraction in the same method as in experiment 6. To determine the impurity content, by ICP analysis, $SiO_2$, CaO, $Na_2O$, and $Fe_2O_3$ were quantitatively analyzed, and the total amount was determined. The mean grain size was measured by taking an SEM picture of fractured surface at magnification of 500 to 1000 times. The bulk specific gravity, porosity, and bending strength was tested and measured according to JIS methods.

Consequently, an incinerator ash tablet was put in the spot facing hole of each test piece, and was heated in the air for 50 hours at 1550° C. After heating, the appearance of each test piece was visually observed to check for melting loss or crack.

Besides, the test piece was cut off, and the polished section was observed by SEM (50 to 200 times) to check for crack, and moreover Si, Fe, Ca, Na, and K were detected by wavelength dispersion type EPMA, at acceleration voltage of 15 kV and probe current of $2.0\times10^7$ A, and after mapping format output, the diffusion depth of these elements was measured, and reaction layer was investigated.

Results are shown in Tables 16 and 17. In Table 17, presence of crack, melting loss or reaction layer is indicated by x-mark, and absence by ○-mark.

As a result, melting loss or crack occurred in SiC, $Si_3N_4$, and $ZrO_2$, and they were found to be improper as the protection tube 1.

In Nos. 81 to 83 in the composition having an excess MgO, and in Nos. 89, 93, 98, 99 having the impurities over 5 wt. %, reaction layers were formed.

By contrast, in ceramics mainly composed of alumina or MgO spinel in Nos. 84 to 88, 90 to 92, 94 to 96, neither melting loss nor crack was noted, and reaction layer with ash components was not found, and they were known to be preferably usable as the protection tube 1.

TABLE 16

| | Composition (wt. %) | | Crystal | Impurity | Bulk specific | Porosity |
|---|---|---|---|---|---|---|
| No. | MgO | $Al_2O_3$ | phase | (wt %) | gravity | (%) |
| 81 | 61 | 39 | $MgAl_2O_4$ + MgO | 0.4 | 3.49 | 0.1 |
| 82 | 44 | 56 | ↑ | 0.4 | 3.49 | 0.1 |
| 83 | 33 | 67 | ↑ | 0.4 | 3.48 | 0.0 |
| 84 | 28 | 72 | $MgAl_2O_4$ | 0.5 | 3.53 | 0.0 |
| 85 | ↑ | ↑ | ↑ | 0.5 | 3.53 | 0.0 |
| 86 | ↑ | ↑ | ↑ | 0.5 | 3.48 | 0.1 |
| 87 | ↑ | ↑ | ↑ | 2.9 | 3.48 | 0.1 |
| 88 | ↑ | ↑ | ↑ | 5.0 | 3.44 | 0.3 |
| 89 | ↑ | ↑ | ↑ | 6.4 | 3.43 | 0.3 |
| 90 | 25 | 75 | $MgAl_2O_4$ + $Al_2O_3$ | 0.7 | 3.52 | 0.1 |
| 91 | 20 | 80 | ↑ | 0.4 | 3.61 | 0.0 |
| 92 | ↑ | ↑ | ↑ | 3.0 | 3.50 | 0.5 |
| 93 | 20 | 80 | ↑ | 6.1 | 3.45 | 3.1 |
| 94 | 10 | 90 | ↑ | 0.4 | 3.73 | 0.0 |
| 95 | 5 | 95 | ↑ | 0.5 | 3.80 | 0.0 |
| 96 | 0 | 100 | $Al_2O_3$ | 0.1 | 3.90 | 0.0 |
| 97 | ↑ | ↑ | ↑ | 0.1 | 3.91 | 0.0 |
| 98 | ↑ | ↑ | ↑ | 5.3 | 3.83 | 0.0 |
| 99 | ↑ | ↑ | ↑ | 9.1 | 3.80 | 0.0 |
| 100 | $ZrO_2$ | | — | 4 | 6.00 | 0.0 |
| 101 | α-SiC | | — | 4 | 3.20 | 0.0 |
| 102 | $Si_3N_4$ | | — | 10 | 3.20 | 0.0 |

TABLE 17

| No | Mean grain size (μm) | Bending strength ($kgf/mm^2$) | Crack, melting loss | Reaction layer | Integrated evaluation |
|---|---|---|---|---|---|
| 81 | 5 | 16 | ○ | x | x |
| 82 | 6 | 17 | ○ | x | x |

TABLE 17-continued

| No | Mean grain size (μm) | Bending strength ($kgf/mm^2$) | Crack, melting loss | Reaction layer | Integrated evaluation |
|---|---|---|---|---|---|
| 83 | 8 | 16 | ○ | x | x |
| 84 | 35 | 20 | ○ | ○ | ○ |
| 85 | 30 | 19 | ○ | ○ | ○ |
| 86 | 3 | 16 | ○ | ○ | ○ |
| 87 | 35 | 15 | ○ | ○ | ○ |
| 88 | 32 | 12 | ○ | ○ | ○ |
| 89 | 32 | 12 | ○ | x | x |
| 90 | 16 | 19 | ○ | ○ | ○ |
| 91 | 13 | 22 | ○ | ○ | ○ |
| 92 | 15 | 12 | ○ | ○ | ○ |
| 93 | 20 | 8 | ○ | x | x |
| 94 | 11 | 25 | ○ | ○ | ○ |
| 95 | 10 | 27 | ○ | ○ | ○ |
| 96 | 11 | 32 | ○ | ○ | ○ |
| 97 | 1 | 50 | ○ | x | x |
| 98 | 22 | 31 | x | — | x |
| 99 | 45 | 27 | x | — | x |
| 100 | 1 | 99 | x | — | x |
| 101 | 7 | 55 | x | — | x |
| 102 | 5 | 60 | x | — | x |

Experiment 12

As embodiment of the invention, in ceramics of Nos. 84, 90, 97 in Table 16, the surface state of the test piece contacting with the incinerator ash tablet was prepared in three types each, that is, as-fired surface, ground surface, and polished surface. In the same method as in experiment 11, the incinerator ash tablet was put and heated, and crack, melting loss, and diffusion depth of Ca element (reaction layer) were investigated.

The results are shown in Table 18. In the surface condition in Table 18, grinding is a process of grinding by about 0.3 mm by using #140 diamond wheel, and polishing is a process of lapping by about 50 μm-by using diamond abrasive with mean grain size of 1 μm on a steel surface plate after the grinding process.

The reaction layer was evaluated as "x" when a Ca element diffusion of 0.3 mm or more is observed from the surface, and "○" when diffusion is less than 0.3 mm.

As shown in Table 18, the as-fired surface, not being ground or polished, in Nos. 84-1, 90-1, 97-1, was free from reaction layer and was excellent in corrosion resistance.

TABLE 18

| No | Surface condition | Surface roughness (μm) | Crack, melting loss | Reaction layer | Integrated evaluation |
|---|---|---|---|---|---|
| 84-1 | As-fired | 2 | o | o | o |
| 84-2 | Ground | 1 | o | x | x |
| 84-3 | Polished | 0.3 | o | x | x |
| 90-1 | As-fired | 2 | o | o | o |
| 90-2 | Ground | 1 | o | x | x |
| 90-3 | Polished | 0.3 | o | x | x |
| 97-1 | As-fired | 2 | o | o | o |
| 97-2 | Ground | 1 | o | x | x |
| 97-3 | Polished | 0.3 | o | x | x |

Experiment 13

Using the material of No. 84-1 in Table 18 (the outer surface 1*a* of the protection tube 1 being in as-fired surface) and the material of No. 84-2 in Table 18 as comparative example (the outer surf ace 1*a* of the protection tube 1 being in ground surf ace), protection tubes 1 of 180 mm in outside diameter, 160 mm in inside diameter, 800 mm in length, and 10 mm in thickness t as shown in FIG. 1 were fabricated.

The protection tube 1 was tested in actual operation in the incinerator ash melting furnace 12 shown in FIG. 2, and the life at temperature of 1500° C. was investigated. The life was expressed by the hours until crack or through-hole was formed in the protection tube 1 due to corrosion.

As shown in Table 19, by using the protection tube 1 of the invention, it was proved to be usable for 2000 hours in the incinerator ash melting furnace.

TABLE 19

| No | Crystal phase | State of outer surface | Life of protection tube (hours) |
|---|---|---|---|
| 84-1 | $MgAl_2O_4$ | As-fired | 2000 or more |
| 84-2 | $MgAl_2O_4$ | Ground | Approx. 1500 |

What is claimed is:

1. A protection tube comprising a tubular body having a closed end and being formed of ceramics having a softening point higher than about 1700° C. in the air atmosphere, a resistance to heat shock of ΔT of about 150° C. or greater determined by a water quenching method, a three-point bending strength of about 150 MPa or greater, and a mean grain size of about 2 μm or greater.

2. A protection tube according to claim 1, wherein the ceramics contain at least one of alumina, MgO spinel, and magnesia.

3. A protection tube comprising a tubular body having a closed end and being formed of ceramics which contain $Al_2O_3$ in an amount of 50 mol % or more of the ceramics and MgO in an amount of 50 mol % or less of the ceramics, the ceramics having a mean grain size of 2 μm or greater.

4. A protection tube according to claim 3, wherein the ceramics contain $Al_2O_3$ and MgO in a total amount of 95 wt. % or more, and at least one impurity selected from the group consisting of $SiO_2$, CaO, $Na_2O$, and $Fe_2O_3$ in an amount of up to 5 wt. %.

5. A protection tube according to claim 3, wherein the ceramics have a porosity of 3% or less.

6. A protection tube according to claim 1, wherein the protection tube has a tubular body having an outer diameter D of about 5 mm or greater and an inner diameter d of about 1 mm or less, and the wherein a thickness t (mm) of the tubular body satisfies the relation $$(D^{1/2}-1.8)/0.3 \geqq t \geqq (D^{1/2}+5.0)/7.$$

7. A protection tube of claim 6, wherein the closed end and a side wall of the tubular body form a smooth curved surface.

8. A protection tube according to claim 6, wherein the closed end of the tubular body is thicker than the side wall.

9. A protection tube according to claim 1, wherein the ceramics adjacent the outer surface of the tubular body has a mean pore size of 20 μm or less, a pore occupation rate of 10% or less, and a pore aspect ratio of 5 or less.

10. A protection tube according to claim 1, wherein the outer surface of the ceramics is an as-fired surface.

* * * * *